US010902743B2

(12) United States Patent
Paudyal et al.

(10) Patent No.: US 10,902,743 B2
(45) Date of Patent: Jan. 26, 2021

(54) GESTURE RECOGNITION AND COMMUNICATION

(71) Applicants: Prajwal Paudyal, Tempe, AZ (US); Ayan Banerjee, Mesa, AZ (US); Sandeep Gupta, Phoenix, AZ (US)

(72) Inventors: Prajwal Paudyal, Tempe, AZ (US); Ayan Banerjee, Mesa, AZ (US); Sandeep Gupta, Phoenix, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 375 days.

(21) Appl. No.: 15/952,784

(22) Filed: Apr. 13, 2018

(65) Prior Publication Data

US 2018/0301061 A1 Oct. 18, 2018

Related U.S. Application Data

(60) Provisional application No. 62/485,566, filed on Apr. 14, 2017.

(51) Int. Cl.
*G09B 21/00* (2006.01)
*G06F 3/01* (2006.01)
(Continued)

(52) U.S. Cl.
CPC ........... *G09B 21/009* (2013.01); *G06F 3/014* (2013.01); *G06F 3/015* (2013.01); *G06F 3/017* (2013.01);
(Continued)

(58) Field of Classification Search
None
See application file for complete search history.

(56) References Cited

U.S. PATENT DOCUMENTS 5,544,050 A * 8/1996 Abe ..................... G09B 21/009
704/1
6,275,789 B1 8/2001 Moser et al.
(Continued)

FOREIGN PATENT DOCUMENTS

| WO | 2001059741 | 8/2001 |
| WO | 2014189685 | 11/2014 |
| WO | 2015199747 | 12/2015 |

OTHER PUBLICATIONS

Rachel Metz, "How Armbands Can Translate Sign Language" Article dated Feb. 17, 2016 https://www.technologyreview.com/s/600818/how-armbands-can-translate-sign-language/. Accessed: Nov. 15, 2016.
(Continued)

*Primary Examiner* — Paul A D'Agostino
(74) *Attorney, Agent, or Firm* — Michael Best & Friedrich LLP (57) ABSTRACT

Systems and methods are described for facilitating non-verbal communication. An electronic processor receives data from the hand-gesture sensor indicative of one or more gestures performed by a user, determines at least one word or phrase corresponding to the data from the hand-gestures sensor, and outputs a text representation of the at least one word or phrase on the display screen. Some systems output the text representation as a natural language sentence based on the data from the hand-gesture sensor and linguistic prosody information determined based, at least in part, on image data of the user captured while performing the one or more gesture. Some systems also includes at least one brain sensor and generate an alternative natural language text sentence in response to detecting a signal from the brain sensor indicative of a contradiction response after displaying the natural language text sentence on the display screen.

19 Claims, 7 Drawing Sheets

(51) Int. Cl.

| | |
|---|---|
| *G06K 9/00* | (2006.01) |
| *G06K 9/62* | (2006.01) |
| *G10L 15/18* | (2013.01) |
| *G10L 15/25* | (2013.01) |
| *G10L 15/22* | (2006.01) |
| *G06F 3/0346* | (2013.01) |
| *G06F 40/10* | (2020.01) |
| *G06F 40/56* | (2020.01) |
| *G06F 40/58* | (2020.01) |
| *G10L 15/26* | (2006.01) |
| *H04B 1/3827* | (2015.01) |

(52) U.S. Cl.
CPC ............ *G06F 3/0346* (2013.01); *G06F 40/10* (2020.01); *G06F 40/56* (2020.01); *G06F 40/58* (2020.01); *G06K 9/00355* (2013.01); *G06K 9/6254* (2013.01); *G10L 15/1807* (2013.01); *G10L 15/22* (2013.01); *G10L 15/25* (2013.01); *G10L 15/26* (2013.01); *H04B 1/3827* (2013.01)

(56) References Cited

U.S. PATENT DOCUMENTS

| | | | |
|---|---|---|---|
| 8,170,656 B2 | 5/2012 | Tan et al. | |
| 8,345,827 B2 | 1/2013 | Liebermann et al. | |
| 8,447,704 B2 | 5/2013 | Tan et al. | |
| 8,493,174 B2 | 7/2013 | Agrawal | |
| 8,566,077 B2* | 10/2013 | Ander | G06F 40/40 |
| | | | 704/2 |
| D717,685 S | 11/2014 | Bailey et al. | |
| 8,892,479 B2 | 11/2014 | Tan et al. | |
| 9,069,385 B1* | 6/2015 | Lynch | G06F 3/017 |
| 9,092,664 B2 | 7/2015 | Forutanpur et al. | |
| D742,272 S | 11/2015 | Bailey et al. | |
| 9,642,543 B2 | 5/2017 | Banerjee et al. | |
| 9,706,963 B2 | 7/2017 | Gupta et al. | |
| 10,074,028 B2 | 9/2018 | Gupta et al. | |
| 10,342,447 B2 | 7/2019 | Banerjee et al. | |
| 2004/0056907 A1* | 3/2004 | Sharma | G06K 9/00335 |
| | | | 715/863 |
| 2008/0163130 A1* | 7/2008 | Westerman | G06K 9/00355 |
| | | | 715/863 |
| 2009/0327171 A1 | 12/2009 | Tan et al. | |
| 2010/0023314 A1 | 1/2010 | Hernandez-Rebollar | |
| 2010/0199228 A1 | 8/2010 | Latta et al. | |
| 2013/0317377 A1 | 11/2013 | Gupta et al. | |
| 2013/0328770 A1* | 12/2013 | Parham | G06F 3/0346 |
| | | | 345/157 |
| 2014/0198034 A1 | 7/2014 | Bailey et al. | |
| 2014/0198035 A1 | 7/2014 | Bailey et al. | |
| 2014/0240103 A1 | 8/2014 | Lake et al. | |
| 2014/0240223 A1 | 8/2014 | Lake et al. | |
| 2014/0249397 A1 | 9/2014 | Lake et al. | |
| 2014/0267024 A1* | 9/2014 | Keller | G06F 3/0233 |
| | | | 345/156 |
| 2014/0318699 A1* | 10/2014 | Longinotti-Buitoni | |
| | | | A61B 5/6805 |
| | | | 156/247 |
| 2014/0334083 A1 | 11/2014 | Bailey | |
| 2015/0051470 A1 | 2/2015 | Bailey et al. | |
| 2015/0057770 A1 | 2/2015 | Bailey et al. | |
| 2015/0067612 A1* | 3/2015 | Yang | G06F 3/04842 |
| | | | 715/856 |
| 2015/0070270 A1 | 3/2015 | Bailey et al. | |
| 2015/0099946 A1* | 4/2015 | Sahin | G16H 10/65 |
| | | | 600/301 |
| 2015/0148641 A1 | 5/2015 | Morun et al. | |
| 2015/0169074 A1 | 6/2015 | Ataee et al. | |
| 2015/0234426 A1 | 8/2015 | Bailey et al. | |
| 2015/0261306 A1 | 9/2015 | Lake | |
| 2015/0277575 A1 | 10/2015 | Ataee et al. | |
| 2015/0286285 A1* | 10/2015 | Pantelopoulos | G09G 5/10 |
| | | | 345/156 |
| 2015/0296553 A1 | 10/2015 | DiFranco et al. | |
| 2015/0301609 A1 | 10/2015 | Park et al. | |
| 2015/0309563 A1* | 10/2015 | Connor | G06F 3/017 |
| | | | 73/865.4 |
| 2015/0316990 A1* | 11/2015 | Pacheco | G06K 9/00389 |
| | | | 715/716 |
| 2015/0347080 A1* | 12/2015 | Shin | G09G 3/003 |
| | | | 345/173 |
| 2015/0370326 A1 | 12/2015 | Chapeskie et al. | |
| 2015/0370333 A1 | 12/2015 | Ataee et al. | |
| 2016/0042228 A1* | 2/2016 | Opalka | G06K 9/00389 |
| | | | 382/103 |
| 2016/0202755 A1* | 7/2016 | Connor | A61B 5/1126 |
| | | | 73/865.4 |
| 2016/0338644 A1* | 11/2016 | Connor | A61B 5/1071 |
| 2018/0103911 A1 | 4/2018 | Gupta et al. | |
| 2019/0188587 A1 | 6/2019 | Gupta et al. | |

OTHER PUBLICATIONS

Motionsavvy. http://www.motionsavvy.com/. Obtained Nov. 14, 2016 version from archive.org.

Signaloud: Gloves That Transliterate Sign Language into Text and Speech. https://curiosity.com/providers/lemelson-mit/. Obtained Jul. 8, 2017 version from archive.org (only archived version on the site). Also obtained https://curiosity.com/topics/these-gloves-give-sound-to-sign-language-curiosity/, which has a date of Apr. 27, 2016.

Anant Agarwal and Manish K Thakur,"Sign Language Recognition Using Microsoft Kinect" In Contemporary Computing, 2013 Sixth International Conference on, pp. 181-185. IEEE, 2013.

Mark Aronoff, Irit Meir, and Wendy Sandler "The Paradox of Sign Language Morphology" Language (Baltimore), 81(2):301-344, Jun. 2005.

Tamiko Azuma, "Working Memory and Perseveration in Verbal Fluency" American Psychological Association, Neuropsychology, 18(1):69-77, 2004.

Tamiko Azuma, Kathryn A. Bayles, Robyn F. Cruz, Cheryl K. Tomoeda, Jody A. Wood, Anna McGeagh and Erwin B. Montgomery Jr. "Comparing the Difficulty of Letter, Semantic, and Name Fluency Tasks for normal Elderly and Patients With Parkinson's Disease" Neuropsychology, 11(4):488-497, 1997.

Tamiko Azuma and Guy C. Van Orden, "Why Safe is Better Than Fast: The Relatedness of a Word's Meanings Affects Lexical Decision Times" Journal of Memory and Language, 36(4): 484-504, 1997.

Tamiko Azuma, Marwan N Sabbagh, and Donald J Connor. "The Effect of Healthy Aging and Mild Cognitive Impairment on Semantic Ambiguity Detection" Journal of Neurolinguistics, 26(2): 271-282, 2013.

Priyanka Bagade, Ayan Banerjee, Sunit Verma, Joseph Milazzo, and Sandeep KS Gupta, "A Holistic Tool for Developing a Wireless Home-Based Health Monitoring System" Biomedical Instrumentation & Technology, 47: 64-71, 2013.

A. Banerjee, K.K. Venkatasubramanian, T. Mukherjee, and S.K.S. Gupta "Ensuring safety, Security, and Sustain Ability of Mission-Critical Cyber-Physical Systems" Proceedings of the IEEE, 100(1):283-299, Jan. 2012.

Ayan Banerjee and Sandeep K. S. Gupta, "Spatio-Temporal Hybrid Automata for Safe Cyber-Physical Systems: A Medical Case Study" Intl' Conj' on Cyber-Physical Systems, pp. 71-80, 2013.

Ayan Banerjee and Sandeep KS Gupta. "Analysis of Smart Mobile Applications for Healthcare Under Dynamic Context Changes" IEEE Transactions on Mobile Computing, 14(5):904-919, 2015.

Ayan Banerjee, Sailesh Kandula, Tridib Mukherjee, and Sandeep K.S. Gupta. "BAND-AiDe: A Tool for Cyber-Physical Oriented Aanalysis and Design of body Area Networks and Devices" ACM Transactions on Embedded Computing Systems (TECS), 11 (S2), Article 49, Aug. 2012.

Koosha Sadeghi Oskooyee, Ayan Banerjee and Sandeep KS Gupta, "Neuro Movie Theatre: A Real-Time Internet-of-People Based (56) References Cited

OTHER PUBLICATIONS

Mobile Application" The 16th International Workshop on Mobile Computing Systems and Applications, 2015.

Panagiotis C Petrantonakis and Leontios J Hadjileontiadis, "Emotion Recognition From EEG Using Higher Order Crossings" IEEE Transactions on Information Technology in Biomedicine, 14(2):186-197, Mar. 2010.

Daniela M. Pfabigan, Eva-Maria Seidel, Ronald Sladky, Andreas Hahn, Katharina Paul, Arvina Grahl, Martin Kblbck, Christoph Kraus, Allan Hummer, Georg S. Kranz, Christian Windischberger, Rupert Lanzenberger and Claus Lamm, 'P300 Amplitude Variation is Related to Ventral Striatum {BOLD} Response During Gain and Loss Anticipation: An {EEG} and FMRI Experiment Neuroimage , 96: 12-21, 2014.

Justus Piater, Thomas Hoyoux, and Wei Du, "Video Analysis for Continuous Sign Language Recognition" Proceedings of 4th Workshop on the Representation and Processing of Sign Languages: Corpora and Sign Language Technologies, pp. 22-23, 2010.

Swann Pichon and Christian A. Kell "Affective and Sensorimotor Components of Emotional Prosody Generation" Journal of Neuroscience, 33(4): 1640-1650, 2013.

Lionel Pigou, Sander Dieleman, Pieter-Jan Kindermans and Benjamin Schrauwen, "Sign Language Recognition Using Convolutional Neural Networks" Workshop at the European Conference on Computer Vision, pp. 572-578. Springer, 2014.

Howard Poizner, Edward S Klima, and Ursula Bellugi. What the hands reveal about the brain. MIT press, 1990.

Leigh Ellen Potter, Jake Araullo and Lewis Carter, "The Leap Motion Controller: A View on Sign Language" Proceedings of the 25th Australian Computer-Human Interaction Conference: Augmentation, Application, Innovation, Collaboration, pp. 175-178. ACM, 2013.

Nicolas Pugeault and Richard Bowden, "Spelling It Out: Real-Time ASL Finger Spelling Recognition" Computer Vision Workshops (ICVWJCCV Workshops), IEEE International Conference on Computer Vision Workshops, pp. 1114-1119, 2011.

Friedemann Pulvermulle r, Niels Birbaumer, Werner Lutzenberger and Bettina Mohr, "High-Frequency Brain Activity: Its Possible Role in Attention, Perception and Language Processing" Elsevier, Progress in Neurobiology, 52(5):427-445, 1997.

Rafael Ramirez and Zacharias Vamvakousis, "Detecting Emotion From EEG Signals Using the Emotive EPOC Device" International Conference on Brain Informatics , pp. 175-184. Springer, 2012.

Gabriela Rosenblau, Dor it Kliemann, Isabel Dziobek, and Hauke R. Heekeren, "Emotional Prosody Processing in Autism Spectrum Disorder" Social Cognitive and Affective Neuroscience, pp. 224-239, 2016.

Koosha Sadeghi, Ayan Banerjee, Javad Sohankar and Sandeep KS Gupta, "Optimization of Brain Mobile Interface Applications Using IoT" Proceedings of the 23rd annual IEEE International Conference on High Performance Computing, Data, and Analytics. IEEE, pp. 23-41, 2016.

Sandeep, K.S. Gupta, "A Tool for Designing High-Confidence Implantable BioSensor Networks for Medical Monitoring" Joint Workshop on High Confidence Medical Devices, Software and Systems (HCMDSS ) and Medical Device Plug-and-Play (MD PnP) Interoperability, 2009.

Wendy Sandler, Irit Meir, Svetlana Dachkovsky,Carol Padden and Mark Aronoff, "The Emergence of Complexity in Prosody and Syntax" Elsevier, Lingua, 121(13):2014-2033, 2011.

Loren Schwiebert, Sandeep K.S. Gupta, and Jennifer Weinmann, "Research Challenges in Wireless Networks of Biomedical Sensors" ACM SigMobiCom '01: Proceedings of the 7th Annual International Conference on Mobile Computing and Networking, pp. 151-165, Rome, Italy, 2001.

Jeremie Segouat, "A Study of Sign Language Coarticulation" ACM SIGACCESS Newsletter, (93):31-38, Jan. 2009.

Mubarak Shah and Ramesh Jain. Motion-based recognition, vol. 9. Springer Science & Business Media, 2013.

Laurie Slovarp, Tamiko Azuma, and Leonard LaPointe, "The Effect of Traumatic Brain Injury on Sustained Attention and Working Memory" Brain injury, 26(1):48-57, Jan. 2012.

Mohammad Soleymani, Sadjad Asghari-Esfeden, Yun Fu and Maja Pantie, "Analysis of EEG Signals and Facial Expressions for Continuous Emotion Detection" IEEE Transactions on Affective Computing, 7(1):17-28, Jan./Mar. 2016.

Thad Stamer, Joshua Weaver and Alex Pentland, "Real-Time American Sign Language Recognition Using Desk and Wearable Computer Based Video" Pattern Analysis and Machine Intelligence, IEEE Transactions on Pattern Analysis and Machine Intelligence, 20(12)1371-1375, Dec. 1998.

Michael Strong and Philip M. Prinz, "A Study of the Relationship Between American Sign Language and English Literacy" Journal of Deaf Studies and Deaf Education, 2(1):37-46, 1997.

Ashwin Thangali, Joan P Nash, Stan Sclaroff and Carol Neidle "Exploiting Phonological Constraints for Handshape Inference in ASL Video" Computer Vision and Pattern Recognition (CVPR), 2011 IEEE Conference on, pp. 521-528. IEEE, 2011.

Venkatasubramanian et al. "Ayushman: A Wireless Sensor Network Based Health Monitoring Infrastructure and Testbed" Distributed Computing in Sensor Systems, pp. 406-407, Jul. 2005.

Myriam Vemeerbergen, Lorraine Leeson and Onno A Crasbom. Simultaneity in signed languages: Form and function, vol. 281. John Benjamins Publishing, 2007.

Christian Vogler and Dimitris Metaxas, "Parallel Hidden Markov Models for American Sign Language Recognition" Computer Vision, 1999, vol. 1, pp. 116-122. IEEE, 1999.

Christian Philipp Vogler, "American Sign Language Recognition: Reducing the Complexity of the Task With Phoneme-Based Modeling and Parallel Hidden Markov Models" PhD thesis, Citeseer, 2003.

Hanjie Wang, Xiujuan Chai, Xiaopeng Hong, Guoying Zhao, and Xilin Chen, "Isolated Sign Language Recognition with Grassmann Covariance Matrices" ACM Transactions on Accessible Computing (TAC-CESS ), 8(4):14, May 2016.

Shangfei Wang, Zhilei Liu, Si liang Lv, Yanpeng Lv, Gu obing Wu, Peng Peng, Fei Chen and Xufa Wang, "A Natural Visible and Infrared Facial Expression Database for Expression Recognition and Emotion Inference" IEEE Transactions on Multimedia, 12(7):682-691, Nov. 2010.

Xiao-Wei Wang, Dan Nie and Bao-Liang Lu, "Emotional State Classification From EEG Data Using Machine Learning Approach" Neurocomputing, 129: 94-106, 2014.

George Wolford "Acquisition of Prosody in American Sign Language" PhD Thesis, Purdue University, 2012.

Jian Wu, Lu Sun, and Roozbeh Jafari, "A Wearable System for Recognizing American Sign Language in Real-Time Using IMU and Surface EMG Sensors" IEEE Journal of Biomedical and Health Informatics, 20 (5):1281-1290, Sep. 2016.

Zhaojun Xue, Dong Ming, Wei Song, Baikun Wan, and Shijiu Jin, "Infrared Gait Recognition Based on Wavelet Transform and Support Vector Machine" Pattern Recognition, 43(8):2904-2910, 2010.

Ruiduo Yang, Sudeep Sarkar, and Barbara Loeding "Handling Movement Epenthesis and Hand Segmentation Ambiguities in Continuous Sign Language Recognition Using Nested Dynamic Programming" IEEE Transactions on Pattern Analysis and Machine Intelligence, 32(3):462-477, Mar. 2010.

Mahmoud M Zaki and Samir I Shaheen, "Sign Language Recognition Using a Combination of New Vision Based Features" Pattern Recognition Letters, 32(4):572-577, 2011.

Erhu Zhang, Yongwei Zhao and Wei Xiong, "Active Energy Image Plus 2DLPP for Gait Recognition" Signal Processing, 90(7): 2295-2302, 2010.

Wei-Long Zheng and Bao-Liang Lu, "Investigating Critical Frequency Bands and Channels for EEG-Based Emotion Recognition With Deep Neural Networks" IEEE Transactions on Autonomous Mental Development, 7(3): 162-175, Sep. 2015.

Wenrning Zheng. Multichannel EEG-Based Emotion Recognition Via Group Sparse Canonical Correlation Analysis, "IEEE Transactions on Cognitive and Developmental Systems" 8(3): 281-290 Sep. 2017.

(56) References Cited

OTHER PUBLICATIONS

Feng Zhou, Fernando De la Torre and Jeffrey F Cohn "Unsupervised Discovery of Facial Events" Computer Vision and Pattern Recognition (CVPR), 2010 IEEE Conference on, pp. 2574-2581. IEEE, 2010.

Nations, United, "Unconvention on the Rights of Persons with Disabilities" Accessed Jul. 16, 2019 [Online] http://www.un.org/disabilities/convention/conventionfull.shtml.

Lawrence Pick, "Health Care Disparities in the Deaf Community" Spotlight on Disability Newsletter, American Psychological Association. Nov. 2013.

Andrea K. McDaniels, "Deaf Patients Say It Can Be Difficult to Communicate at Hospitals" The Baltimore Sun. [Online] http://www.baltimoresun.com/health/maryland-health/bs-hs-sign-language-hospital-20150913-story.html. Article dated Sep. 13, 2015.

Alexa Kuenburg, Paul Fellinger, and Johannes Fellinger, "Health Care Access Among Deaf People" 21(1): I-10, Journal of Deaf Studies and Deaf Education, 2015.

D. B. Scheier MS, RN, "Barriers to Health Care for People With Hearing Loss; A review of the Literature" The Journal of the New York State Nurses' Association, 40 (1) 2009.

C. C. Lieu, G. R. Sadler, J. T. Fullerton, and P. D. Stohlmann, "Communication Strategies for Nurses Interacting With Patients Who Are Deaf" Dermatology Nursing/Dermatology Nurses' Association, 19(6), 2007.

R. Q. Pollard, Jr., W. R. Betts, J. K. Carroll, J. A. Waxmonsky, S. Barnett, F. V. deGruy, III, L. Pickier and Y. Kellar-Guenther, "Integrating Primary Care and Behavioral Health with Four Special Populations: Children with Special Needs, People with Serious Mental Illness, Refugees, and Deaf People" The American Psychologist, 69(4): 344-387, 2014.

National Association for Deaf, "Guidelines for Usage of Video Remote Interpreter" [Online] https://nad.org/issues/technology/vri/position-statement-hospitals. Accessed Jun. 20, 2016.

Alexis Kashar, "Guidelines for Using VRI in Medical Settings, Texas Department of Assistive and Rehabilitative Services" [Online] http://www.dars.state.tx.us/dhhs/hospitalvri.shtml. Accessed Jun. 20, 2019.

Meinard Muller, "Dynamic Time Warping" Information Retrieval for Music and Motion, pp. 69-84, Springer 2007.

Nikhita Praveen, Naveen Karanth, and MS Megha, "Sign Language Interpreter Using a Smart Glove" 2014 International Conference on Advances in Electronics, Computers and Communications (ICAECC), pp. 1-5. IEEE, 2014.

Sara Bilal, Rini Akmeliawati, Amir A Shafie, and Momoh Jimoh E Salami, "Hidden Markov Model for Human to Computer Interaction: A Study on Human Hand Gesture Recognition" Artificial Intelligence Review, 40(4):495-516, 2013.

Christian Vogler and Dimitri Metaxas, "ASL Recognition Based on a Coupling Between HMMS and 3D Motion Analysis" IEEE Sixth International Conference on Computer Vision, In Computer Vision, pp. 363-369, 1998.

Aaron J. Newman, Daphne Bavelier, David Corina Peter Jezzard and Helen J. Neville, "A Critical Period for Right Hemisphere Recruitment in American Sign Language Processing: Nature Publishing Group" http://neurosci.nature.com, Published online 2001.

Frank Adelstein, Sandeep KS Gupta, Golden Richard, and Loren Schwiebert, "Fundamentals of Mobile and Pervasive Computing" vol. 1. McGraw-Hill New York, 2005.

B.J. Bahan, "Non-Manual Realization of Agreement in American Sign Language" UMI Dissertation Services. UMI, 1996.

Baptiste Caramiaux, Marco Donnarumma, and Atau Tanaka. Understanding Gesture Expressivity Through Muscle Sensing. ACM Transactions on Computer-Human Interaction (TOCHI), 21(6):31, Jan. 2015.

Feng-Sheng Chen, Chih-Ming Fu, and Chung-Lin Huang. Hand Gesture Recognition Using a Real-Time Tracking Method and Hidden Markov Models. Image and Vision Computing, 21(8):745-758, 2003.

Xiang Chen, Xu Zhang, Zhang-Yan Zhao, Ji-Hai Yang, Vuokko Lantz, and Kong-Qiao Wang, "Hand Gesture Recognition Research Based on Surface EMG Sensors and 2D-Accelerometers" 11th IEEE International Symposium on Wearable Computers, pp. 11-14. IEEE, 2007.

Philip R. Cohen and Sharon L. Oviatt, "The Role of Voice Input for Human-Machine Communication" Proceedings of the National Academy of Sciences, 92(22):9921-9927, Oct. 1995.

Andrea Corradini, "Dynamic Time Warping for Off-Line Recognition of a Small Gesture Vocabulary" Recognition, Analysis, and Tracking of Faces and Gestures in Real-Time Systems, 2001. Proceedings. IEEE ICCV Workshop on, pp. 82-89. IEEE, 2001.

E. Costello, "Random House Webster's American Sign Language Dictionary" Random House Reference, 2008.

Sandeep KS Gupta, Tridib Mukherjee, and Krishna Kumar Venkatasubramanian, "Body Area Networks: Safety, Security, and Sustainability" Cambridge University Press, 2013.

Deng-Yuan Huang, Wu-Chih Hu, and Sung-Hsiang Chang, "Vision-Based Hand Gesture Recognition Using PCA +Gabor Filters and SVM" Fifth International Conference on Intelligent Information Hiding and Multimedia Signal Processing, pp. 1-4. IEEE, 2009.

T. Johnston and A. Schembri, "Australian Sign Language (Auslan): An Introduction to Sign Language Linguistics" Cambndge University Press, 2007.

Daniel Kelly, Jane Reilly Delannoy, John McDonald, and Charles Markham, "A Framework for Continuous Multimodal Sign Language Recognition" 2009 International Conference on Multimodal Interfaces, pp. 351-358. ACM, 2009.

Kyung-Won Kim, Mi-So Lee, Bo-Ram Soon, Mun-Ho Ryu, and Je-Nam Kim, "Recognition of Sign Language with an Inertial Sensor-Based Data Glove" Technology and Health Care, 24(1):S223-S230, 2015.

Oscar Koller, Jens Forster, and Hermann Ney, "Continuous Sign Language Recognition: Towards Large Vocabulary Statistical Recognition Systems Handling Multiple Signers" Computer Vision and Image Understanding, 141:108-125, 2015.

T. Kuroda, Y. Tabata, A. Goto, H. Ikuta, M. Murakami, et al., "Consumer Price Data-Glove for Sign Language Recognition" 5th Intl Conf. Disability, Virtual Reality Assoc. Tech., Oxford, UK, pp. 253-258, 2004.

Li, Y. et al., "Automatic Recognition of Sign Language Subwords Based on Portable Accelerometer and EMG Sensors", International Conference on Multimodal Interfaces and the Workshop on Machine Learning for Multimodal Interaction (Beijing, China, Nov. 8-10, 2010), 2010, article 17, 7 pages <DOI:10.1145/1891903.1891926>.

Rung-Huei Liang and Ming Ouhyoung, "A Real-Time Continuous Gesture Recognition System for Sign Language" 3rd IEEE International Conference on Automatic Face and Gesture Recognition, pp. 558-567. IEEE, 1998.

Robert B Miller, "Response Time in Man-Computer Conversational Transactions" In Proceedings of the Dec. 9-11, 1968, Fall Joint Computer Conference, part I, pp. 267-277. ACM, 1968.

Sushmita Mitra and Tinku Acharya, "Gesture Recognition: A Survey" IEEE Transactions on Systems, Man, and Cybermetics, Part C: Applications and Reviews, 37(3)311-324, May 2007.

Louis-Philippe Morency, Ariadna Quattoni, and Trevor Darrell, "Latent-Dynamic Discriminative Models for Continuous Gesture Recognition" IEEE Conference on Computer Vision and Pattern Recognition, pp. 1-8. IEEE, 2007.

Yuji Nagashima, "Present Stage and Issues of Sign Linguistic Engineering" HCI, 2001.

Madhurima Pore, Koosha Sadeghi, Vinaya Chakati, Ayan Banerjee, and Sandeep KS Gupta, "Enabling Real-Time Collaborative Brain-Mobile Interactive Applications on Volunteer Mobile Devices" 2nd International Workshop on Hot Topics in Wireless, pp. 46-50. ACM, 2015.

Lawrence R Rabiner, A Tutorial on Hidden Markov Models and Selected Applications in Speech Recognition, Proceedings of the IEEE, 77(2):257-286, 1989.

Eva Safar and Ian Marshall, "The Architecture of an English-Text-To-Sign-Languages Translation System" In Recent Advances in Natural Language Processing (RANLP), pp. 223-228. Tzigov Chark Bulgaria, 2001.

(56) References Cited

OTHER PUBLICATIONS

Javad Sohankar, Koosha Sadeghi, Ayan Banerjee, and Sandeep KS Gupta "E-bias: A Pervasive EEG-Based Identification and Authentication System" 11th ACM Symposium on QoS and Security for Wireless and Mobile Networks, pp. 165-172. ACM, 2015.

W.C. Stokoe, D.C. Casterline, and C.G. Croneberg, "A Dictionary of American Sign Language on Linguistic Principles" Linstok Press, 1976.

W.C. Stokoe, "The Study of Sign Language" ERIC Clearinghouse for Linguistics, Center for Applied Linguistics, 1970.

R.A. Tennant and M.G. Brown, "The American Sign Language Handshape Dictionary" Clerc Books, 1998.

Andrew D Wilson and Aaron F Bobick, "Parametric Hidden Markov Models for Gesture Recognition" IEEE Transactions on Pattern Analysis and Machine Intelligence, 21(9):884-900, 1999.

Prajwal Paudyal, Ayan Banerjee and Sandeep K.S. Gupta, "Sceptre: A Perasive, Non-Invasive Programmable Gesture Recognition Technology" 21st International Conference on Intelligent User Interfaces, pp. 282-293 Mar. 2016, ACM 978-1-4503-4137.

Companies and Markets., "Global Gesture Recognition Market for Smart TV 2015-2019" [online], Market Research, 2015 [retrieved on Feb. 25, 2016 from companiesandmarkets.com], retrieved from the internet: <URL:http://www.companiesandmarkets.com/Market/Security/Market-Researc...obal-Gesture-Recognition-Market-for-Smart-TV-2015-2019/RPT1289321>.

Das, S. et al., "Sign Language Recognition Using Facial Expression", Procedia Computer Science, 2015 (available online Aug. 2015), vol. 58, pp. 210-216 <DOI:10.1016/j.procs_2015.08.056>.

Dawes, T., "Researchers train Myo armbands to translate sign language into text" [online], Cantech Letter, Feb. 2016 [retrieved on Feb. 25, 2016 from cantechletter.com, as it appeared on Feb. 19, 2016], retrieved from the internet: <URL:http://www.cantechletter.com/2016/02/researchers-train-myo-armbands-to-translate-sign-language-into-text/>.

Escudeiro, P. et al., "Automatic Sign Language Translator Model", Advanced Science Letters, 2011, vol. 4, pp. 100-407 <DOI:10.1166/asl.2011.1261>.

Escudeiro, P. et al., "Virtual Sign—A Real Time Bidirectional Translator of Portuguese Sign Language", Procedia Computer Science, 2015 (available online Nov. 2015), vol. 67, pp. 252-262 <DOI:10.1016/j.procs.2015.09.269>.

Kosmidou, V. et al., "Evaluation of surface EMG features for the recognition of American Sign Language gestures", International Conference of the IEEE Engineering in Medicine and Biology Society (New York, NY, Aug. 30-Sep. 3, 2006), 2006 (date added to IEEE Xplore Dec. 2016), pp. 6197-6200 <DOI:10.1109/IEMBS.2006.259428>.

Kosmidou, V. et al., "Sign Language Recognition Using Intrinsic-Mode Sample Entropy on sEMG and Accelerometer Data", IEEE Transactions on Biomedical Engineering, Dec. 2009 (date of publication Jan. 2009), vol. 56, No. 12, pp. 2879-2890 <DOI:10.1109/TBME.2009.2013200>.

Kumar, D. et al., "A Proficient Technique to Communicate and to Detect Emotions of a Differently-Abled Persons Using Sensor Devices and Electroencephalogram Signals", International Journal of Engineering and Innovative Technology, Mar. 2013, vol. 2, No. 9, pp. 17-24 <DOI:10.5958/2249-7315.2016.00602.X>.

Parvin, R., "Hand Talk-A Sign Language Recognition Based on Accelerometer and SEMG Data", International Journal of Innovative Research in Computer and Communication Engineering, Jul. 2014, vol. 2, No. 3, pp. 206-215.

Wu, J. et al., "Real-time American Sign Language Recognition Using Wrist-Worn Motion and Surface EMG sensors", IEEE 12th International Conference on Wearable and Implantable Body Sensor Networks (Cambridge, MA, Jun. 9-12, 2015), 2015 (date added to IEEE Xplore Oct. 2015), 6 pages <DOI:10.1109/BSN.2015.7299393>.

Zhang, X. et al., "A Framework for Hand Gesture Recognition Based on Accelerometer and EMG Sensors", IEEE Transactions on Systems, Man and Cybernetics Part A: Systems and Humans, Nov. 2011 (date of publication Mar. 2011), vol. 41, No. 6, pp. 1064-1076 <DOI:10.1109/TSMCA.2011.2116004>.

Ayan Banerjee, Sunit Verma, Priyanka Bagade, and Sandeep K. S. Gupta, "Health-Dev: Model Based Development Pervasive Health Monitoring Systems" BSN, pp. 85-90, IEEE 2012.

Ayan Banerjee, Yi Zhang, Paul Jones, and Sandeep Gupta "Using Formal Methods to Improve Home-Use Medical Device Safety" Biomedical Instrumentation & Technology, Association for the Advancement of Medical Instrumentation, pp. 43-48, Spring 2013.

Britta Bauer and Kraiss Karl-Friedrich, "Towards an Automatic Sign Language Recognition system Using Subunits" International Gesture Workshop, pp. 64-75. Springer, 2001.

Britta Bauer and K-F Kraiss. "Video-Based Sign Recognition Using Self-Organizing Subunits" Pattern Recognition, 2002, Proceedings. 16th International Conference, (2), pp. 434-437. IEEE, 2002.

Michel Belyk and Steven Brown, "Perception of Affective and Linguistic Prosody: An ALE Meta-Analysis of Neuroimaging Studies" Social Cognitive and Affective Neuroscience, 9(9):1395-1403, 2014.

Emmanuel Biau, Luis Moris Fernandez, Henning Holle, Cesar Avila, and Salvador Soto-Faraco, "Hand Gestures as Visual Prosody: BOLD Responses to Audio-Visual Alignment are Modulated by the Communicative Nature of the Stimuli" Neuroimage, 132:129-137, 2016.

Emmanuel Biau and Salvador Soto-Faraco, "Synchronization by the Hand: The Sight of Gestures Modulates Low-Frequency Activity in Brain Responses to Continuous Speech" Frontiers in Human Neuroscience, 9:527, 2015.

Vladimir Bostanov and Boris Kotchoubey, "Recognition of Affective Prosody: Continuous Wavelet Measures of Event-Related Brain Potentials to Emotional Exclamations" Psychophysiology, 41(2):259-268, 2004.

Diane Brentari. A prosodic model of sign language phonology. Mit Press, 1998.

Diane Brentari, "Modality Differences in Sign Language Phonology and Morphophonemics" Modality and Structure in Signed and Spoken Languages, pp. 35-64, Cambridge University Press, 2002.

Diane Brentari, "Sign Language Phonology" The Handbook of Phonological Theory, Second Edition, pp. 691-721, 2011.

Diane Brentari, Joshua Falk, and George Wolford, "The Acquisition of Prosody in American Sign Language" Language, 91(3):e 144-e 168, Sep. 2015.

Joseph M Byrne, John F Connolly, Shannon E MacLean, Joseph M Dooley, Kevin E Gordon, and Tricia L Beattie, "Brain Activity and Language Assessment Using Event-Related Potentials: Development of a Clinical Protocol" Developmental Medicine & Child Neurology, 41(11):740-747, 1999.

George Caridakis, Stylianos Asteriadis, and Kostas Karpouzis, "Non-Manual Cues in Automatic Sign Language Recognition" Personal and Ubiquitous Computing, 18(1):37-46, 2014.

Helen Cooper, Eng-Jon Ong, Nicolas Pugeault, and Richard Bowden, "Sign Language Recognition Using Subunits" Journal of Machine Learning Research, Jul. 13:2205-2231, 2012.

Kearsy A. Cormier, Richard P. Meier, and David Quinto-Pozos, editors. Modality and Structure in Signed and Spoken Languages. Cambridge University Press, New York, 2002.

Katherine A DeLong, Thomas P Urbach, and Marta Kutas, "Probabilistic Word Pre-Activation During Language Comprehension Inferred From Electrical Brain Activity" Nature Neuroscience, 8(8):1117-1121, 2005.

Mohammad Omar Derawi, Claudia Nickel, Patrick Bours, and Christoph Busch, "Unobtrusive User-Authentication on Mobile Phones Using Biometric Gait Recognition" Intelligent Information Hiding and Multimedia Signal Processing (IIH-MSP), 2010 Sixth International Conference on, pp. 306-311. IEEE, 2010.

Liya Ding and Aleix M. Martinez, "Modelling and Recognition of the Linguistic Components in American Sign Language" Image and Vision Computing, 27( 12): 1826-1844, 2009.

K Emmorey, "The Neurobiology of Sign Language" Academic Press, Waltham, pp. 475-479, 2015.

Karen Emmorey and David Corina, "Lexical Recognition in Sign Language: Effects of Phonetic Structure and Morphology" Perceptual and Motor Skills, 71:1227-1252, 1990.

(56) References Cited

OTHER PUBLICATIONS

Gaolin Fang, Wen Gao, and Debin Zhao, "Large Vocabulary Sign Language Recognition Based on Fuzzy Decision Trees" Systems, Man and Cybernetics, Part A: Systems and Humans, IEEE Transactions on, 34(3):305-314, 2004.

Kenneth I Forster and Tamiko Azuma, "Masked Priming for Prefixed Words With Bound Stems: Does Submit Prime Permit?" Language and cognitive processes, 15(4-5):539-561, 2000.

Susan Goldin-Meadow, "Talking and Thinking With Our Hands" Current Directions in Psychological Science, 15(1):34-39, 2006.

Stephen D. Goldinger, Tamiko Azuma, Marianne Abramson, and Pushpam Jain. "Open Wide and Say Blah! Attentional Dynamics of Delayed Naming" Journal of Memory and Language, 37(2):190-216, 1997.

S. K. S. Gupta, T. Mukherjee, and K. Venkatasubramanian, "Criticality Aware Access Control Model for Pervasive Applications" PERCOM '06: Proceedings of the Fourth Annual IEEE International Conference on Pervasive Computing and Communications, pp. 251-257, Washington, DC, USA, 2006. IEEE Computer Society.

Sandeep K.S. Gupta, "Towards Formal Framework for Modeling and Evaluation of High-Confidence Criticality-Aware Software for Distributed CPS: A white paper" National Workshop for Research on High Confidence Transportation Cyber Physical Systems: Automotive, Avaition, and Rail, 2008.

Sandeep K.S. Gupta, "Towards Human-Centric Middleware for Future Automotive CPS: A White Paper" Signal Processing, 90(7): 2295-2302, 2010.

Hermann Haken. Principles of brain functioning: a synergetic approach to brain activity, behavior and cognition, vol. 67. Springer Science & Business Media, 2013.

Cem Keskin, Furkan Kira, Yunus Emre Kara, and Lale Akarun, "Hand Pose Estimation and Hand Shape Classification Using Multi-Layered Randomized Decision Forests" In European Conference on Computer Vision, pp. 852-863. Springer, 2012.

Reza Khosrowabadi, Hiok Chai Quek, Abdul Wahab, and Kai Keng Ang, "EEG-Based Emotion Recognition Using Self-Organizing Map for Boundary Detection" 2010 20th International Conference on Pattern Recognition, pp. 4242-4245. IEEE, 2010.

Min-Ki Kim, Miyoung Kim, Eunmi Oh, and Sung-Phil Kim, "A Review on the Computational Methods for Emotional State Estimation From the Human EEG" Computational and Mathematical Methods in Medicine, 2013.

W.W. Kong and Surendra Ranganath, "Towards Subject Independent Continuous Sign Language Recognition: A Segment and Merge Approach" Pattern Recognition, 47(3):1294-1308, 2014.

Boris Kotchoubey, Jochen Kaiser, Vladimir Bostanov, Werner Lutzenberger, and Niels Birbaumer. "Recognition of Affective Prosody in Brain-Damaged Patients and Healthy Controls: A Neurophysiological Study Using EEG and Whole-Head MEG" Cognitive, Affective, & Behavioral Neuroscience, 9(2):153-167, 2009.

Simon Lang, Marco Block, and Raul Rojas "Sign Language Recognition Using Kinect" In International Conference on Artificial Intelligence and Soft Computing, pp. 394-402. Springer, 2012.

Kehuang Li, Zhengyu Zh ou, a nd Chin-Hui Lee, "Sign Transition Modeling and a Scalable Solution to Continuous Sign Language Recognition for Real-World Applications" ACM Trans. Access. Comput., 8(2):7:1-7:23, Jan. 2016.

Mairead MacSweeney, Cheryl M Capek, Ruth Campbell, and Bencie Woll, "The Signing Brain: The Neurobiology of Sign Language" Trends in Cognitive Sciences, 12(11):432-440, 2008.

Mark McAvoy, Anish Mitra, Rebecca S. Coalson, Steven E Petersen, and Marcus E Raichle, "Unmasking Language Lateralization in Human Brain Intrinsic Activity" Cerebral Cortex, p. 1733-1746, 2015.

Ross E Mitchell, Travas A Young, Bellamie Bachleda, and Michael A Karchmer, "How Many People Use ASL in the United States? Why Estimates Need Updating" Sign Language Studies, 6(3):306-335, Spring 2006.

T. Mukherjee and S.K.S. Gupta, "A Modeling Framework for Evaluating Effectiveness of Smart-Infrastructure Crises Management Systems" In IEEE Conference on Technologies for Homeland Security, 2008 (HST), pp. 549-554. May 2008.

T. Mukherjee, K. Venkatasubramanian, and S.K.S. Gupta, "Performance Modeling of Critical Event Management For Ubiquitous Computing Applications" Proceedings of the 9th ACM International Symposium on Modeling Analysis and Simulation of Wireless and Mobile Systems, pp. 12-19, May 2006.

Tridib Mukherjee and Sandeep K.S. Gupta, "C ret: A Crisis Response Evaluation Tool to Improve Crisis Preparedness" IEEE International Conference on Technologies for Homeland Security, May 2009.

Tridib Mukherjee and Sandeep K.S. Gupta, "MCMA+CRET: A Mixed Criticality Management Architecture for Maximizing Mission Efficacy and Tool for Expediting Certification of UAVA" IEEE International Workshop on Mixed Criticality: Roadmap to Evolving UAV Certification at the Cyber-Physical Systems Week, Apr. 2009.

Thomas F Munte, Hans-Jochen Heinze, and George R Mangun, "Dissociation of Brain Activity Related to Syntactic and Semantic Aspects of Language" Journal of Cognitive Neuroscience, 5(3):335-344, 1993.

S. Nabar, A. Banerjee, S. K. S. Gupta and R. Poovendran, "GeM-REM: Generative Model-Driven Resource Efficient ECG Monitoring in Body Sensor Networks" 2011 International Conference on Body Sensor Networks (BSN ), pp. 1-6 . IEEE, 2011.

S. Nabar, A. Banerjee, S. K. S. Gupta, and R. Poovendran, "Resource-Efficient and Reliable Long Term Wireless Monitoring of the Photoplethysmographic Signal" Wireless Health, pp. 9:1-9:10. ACM, 2011.

S. Nabar, A. Banerjee, S. K.S. Gupta and R. Poovendran, "Valuation of Body Sensor Network Platforms: A Design Space and Benchmarking Analysis" Wireless Health, ACM 978(1), pp. 118-127, Oct. 2010.

Carol Neidle, Jingjing Liu, Bo Liu, Xi Peng, Christian Vogler and Dimitris Metaxas, Computer-Based Tracking, Analysis, and Visualization of Linguistically Significant Nonmanual Events in American Sign Language (ASL). LREC Workshop on the Representation and Processing of Sign Languages: Beyond the Manual Channel. Citeseer, 2014.

Carol Neidle and Christian Vogler, "A New Web Interface to Facilitate Access to Corpora. Development of the ASLLRP Data Access Interface (DAI)" In Proc. 5th Workshop on the Representation and Processing of Sign Languages: Interactions between Corpus and Lexicon, LREC, 2012.

Sylvie C.W. Ong and Surendra Ranganath, "Automatic Sign Language Analysis: A Survey and the Future Beyond Lexical Meaning" IEEE Transactions on Pattern Analysis and Machine Intelligence, 27 (6): 873-891, Jun. 2005.

\* cited by examiner

GESTURE RECOGNITION AND COMMUNICATION

RELATED APPLICATIONS

This application claims the benefit of U.S. Provisional Application No. 62/485,566, filed Apr. 14, 2017, and entitled "GESTURE RECOGNITION AND COMMUNICATION," the entire contents of which are incorporated herein by reference.

BACKGROUND

The present invention relates to methods and systems for facilitating non-verbal communication.

SUMMARY

Non-verbal communication is a big part of day-to-day interactions. Body movements can be a powerful medium for non-verbal communication, which is done most effectively through gestures. However, the human-computer interfaces today are dominated by text based inputs and are increasingly moving towards voice-based control. Although speech is a very natural way to communication with other people and computers, it can be inappropriate in certain circumstances that require silence, or impossible in the case of deaf people.

In some embodiments, the system and methods described herein provide a common protocol for gesture-based communication and a framework that can successfully translate such communication gestures to meaningful information in real-time. In some embodiments, these systems and methods are pervasive and non-invasive.

In one embodiment, the invention provides a system for facilitating non-verbal communication. The system includes a hand-gesture sensor, a display screen, and an electronic processor. The electronic processor is configured to receive data from the hand-gesture sensor indicative of one or more gestures performed by a user. Based on the data from the hand-gesture sensor, the system determines at least one word or phrase corresponding to the data from the hand-gestures sensor and outputs a text representation of the at least one word or phrase on the display screen. In some embodiments, the system is further configured to output the text representation as a natural language sentence based on the data from the hand-gesture sensor and linguistic prosody information determined based, at least in part, on image data of the user captured while performing the one or more gesture. In some embodiments, the system also includes at least one brain sensor and generates an alternative natural language text sentence in response to detecting a signal from the brain sensor indicative of a contradiction response after displaying the natural language text sentence on the display screen.

In another embodiment, the invention provides a system for deciphering gesture-based communication. The system includes two-non-invasive wrist-worn devices and applies a multi-tiered template-based comparison system for classification to input data from an accelerometer, gyroscope, and electromyography sensors incorporated into the wrist-worn devices. In some embodiments, the system is trained to detect and identify various specific gestures including, for example, American Sign Language (ASL).

In yet another embodiment, the invention provides a system for deciphering gesture-based communication including a hand gesture sensor, a brain sensor, a camera, and an ear accelerometer. In some implementations, the hand gesture sensor includes at least one wrist-worn device that includes an accelerometer, a gyroscopic sensor, and an electromyography sensor. The system is configured to identify one or more hand gestures based at least in part on data received from the hand gesture sensors and generating a proposed output text based on the identified hand gestures and data from at least one additional sensor (e.g., the brain sensor, the camera, or the ear accelerometer). In some implementations, the system is configured to determine whether the proposed output text is to be generated as a statement, a question, or an exclamation based on the data from the at least one additional sensor.

In still other embodiments, the invention provides a system for deciphering and refining gesture-based communication including a hand gesture sensor and a brain sensor. The system is configured to identify one or more hand gestures based at least in part on data received from the hand gesture sensor, generates a first proposed output text, and displays the first proposed output text on a screen. While displaying the first proposed output text, the system monitors data from the brain sensor for a contradiction signal. In response to detecting the contradiction signal, the system generates a second proposed output text and displays the second proposed output text on the screen. In some embodiments, the system is configured to operate in a closed-loop repeatedly generating and displaying additional subsequent proposed output text until the contradiction signal is not detected in the data from the brain sensor while the proposed output text is displayed on the screen. In some embodiments, the system is configured to automatically transmit the proposed output text to a second user device in response to determining that the contradiction signal is not detected in the data from the brain sensor while the proposed output text is displayed on the screen.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
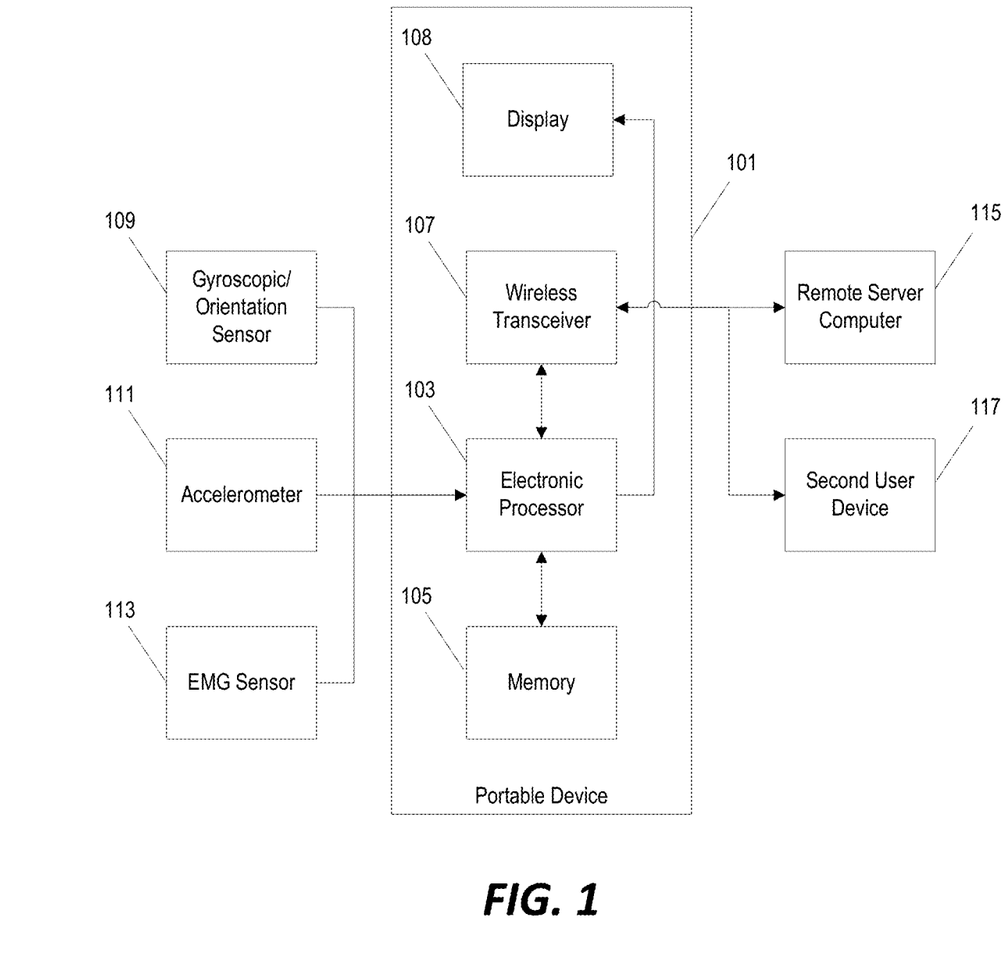
FIG. 1 is a block diagram of a system for automated gesture recognition-based communication according to one embodiment.

FIG. 1 illustrates an example of a communication system configured to decipher gesture-based communication. The system in this example includes a portable device 101 such as, for example, a smart phone, tablet computer, a laptop computer, or other device. Although the example of FIG. 1 includes a portable device 101, in other implementations the functionality and hardware described in reference to the portable device 101 may be implemented in a non-portable device such as, for example, a desktop computer.

The portable device 101 includes an electronic processor 103 and a non-transitory, computer-readable memory 105. The memory 105 stores data and instructions that are executed by the electronic processor 103 to provide certain functionality of the portable device 101. The portable device 101 also includes a wireless transceiver 107 and a display 108. The portable device 101 is selectively coupleable to a series of sensors including a gyroscopic/orientation sensor 109, an accelerometer 111, and an EMG sensor 113. In some implementations, some of all of these sensors 109, 111, 113 are provided in a single wrist-worn device such as, for example, the "Myo" Armband from Thalmic Labs, Inc. Furthermore, although the example of FIG. 1 only shows one of each of the gyroscopic sensor 109, accelerometer 111, and EMG sensor 113, in some implementations the portable device 101 is selectively coupleable to two sets of sensors—one to be worn on each arm of the user. In some implementations, the sensors are selectively coupleable to the portable device by a wired or wireless communication link (e.g., Bluetooth, WiFi, etc.). Through the wireless transceiver 107, the portable device 101 is further configured to communicate with a remote server computer 115 and one or more additional user device (e.g., the second user device 117).

Figure 2:
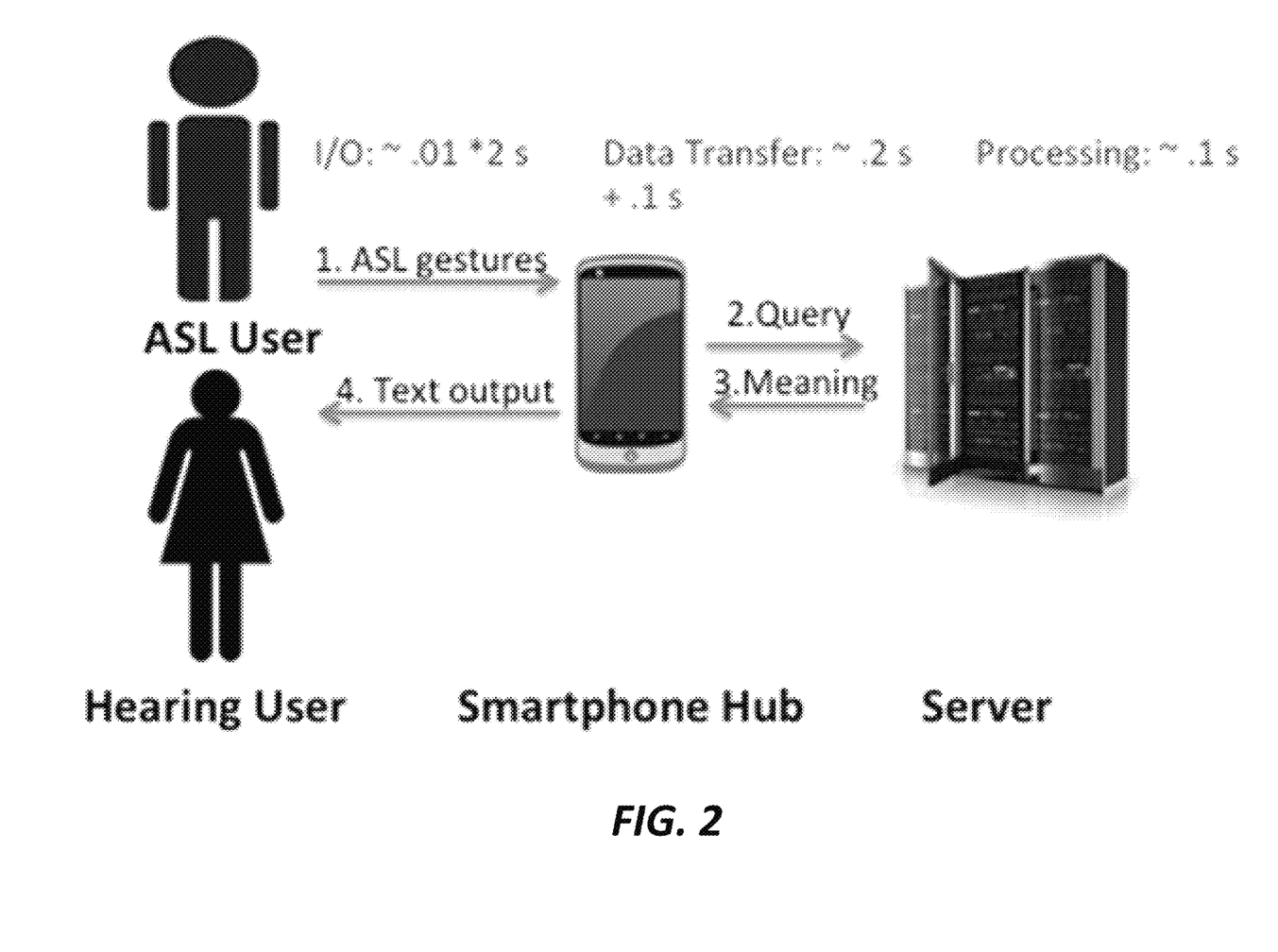
FIG. 2 is a schematic flowchart of a method of communication by translating ASL gestures into text output using the system of FIG. 1.

The system illustrated in the example of FIG. 1 can be used to facilitate gesture-based communication. For example, FIG. 2 illustrates one method of facilitating communication between a deaf person who is able to communicate using American Sign Language (ASL) and a hearing person who does not understand ASL using the system of FIG. 1. The deaf user wears the sensors illustrated in FIG. 1 and uses hand/arm gestures to communicate using ASL. The portable device 101 monitors data from the sensors and forwards a query based on the received gesture data to the remote server computer 115. The remote server computer 115 processes the gesture data to decipher the meaning of the ASL gestures and transmits a response to the portable device 101. The portable device 101 then outputs a text-based translation of the ASL gestures on the display 108. The deaf user can then communicate the message to the hearing user by showing the display 108 of the portable device 101 to the hearing user. Alternatively, the system might be configured to output the translated ASL message as audio through a speaker of the portable device 101 instead of or in addition to displaying the translated ASL message as text. In still other implementations, instead of outputting the translated ASL message as text or audio through the portable device 101, the system may be further configured to transmit the translated message to the second user device 117 (e.g., the smart phone or tablet computer of the hearing person).

In the example of FIG. 2, the processing of the sensor data is offloaded to the remote server computer 115. However, in other implementations, the system may be configured to perform some or all of the data processing locally on the electronic processor 103. Furthermore, in still other implementations in which the portable device 101 is implemented as a smart phone or tablet computer, the graphics processing unit (GPU) of the portable device can be utilized to parallelize the conversion method for faster execution.

Figure 3:
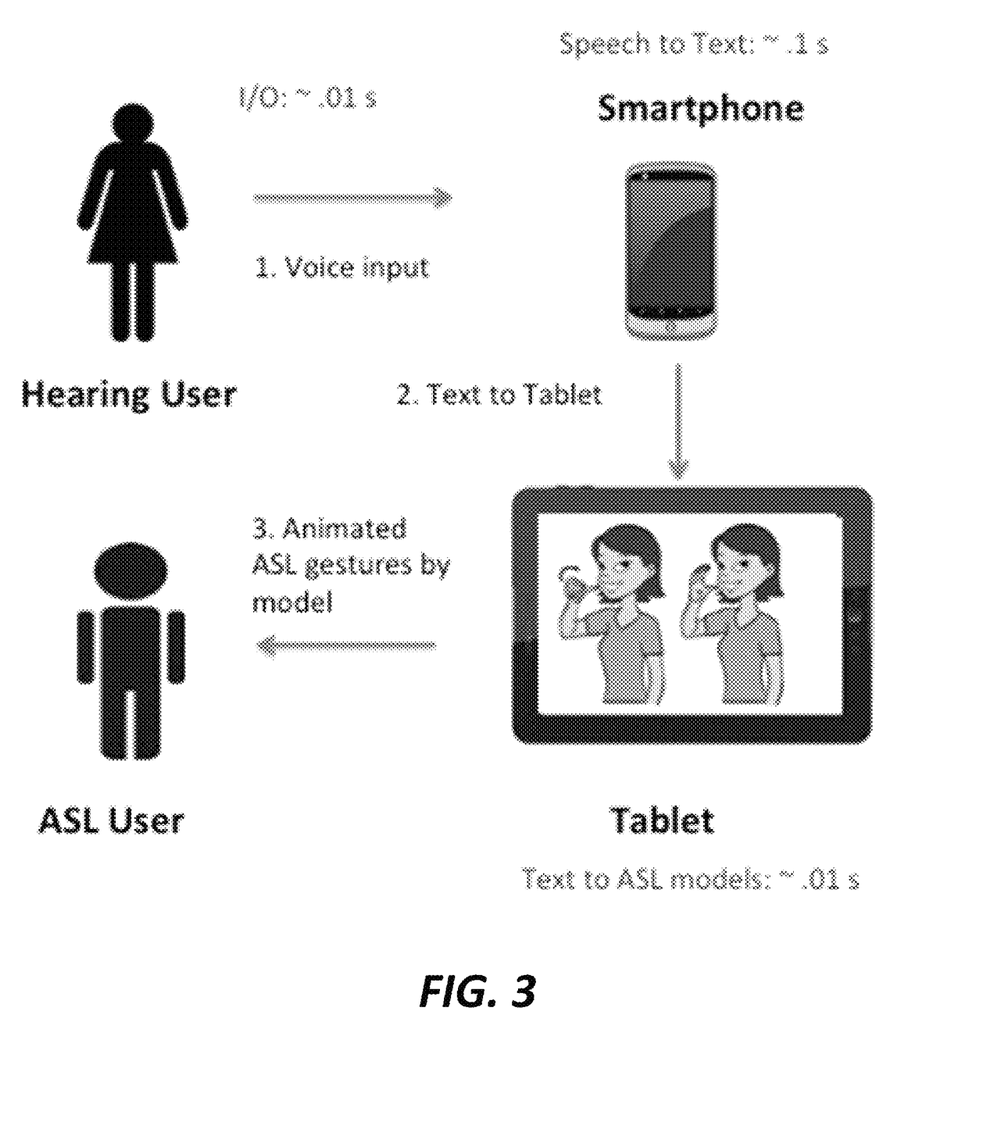
FIG. 3 is a schematic flowchart of a method of communication by translating audio input into an animated video depiction of ASL gestures using the system of FIG. 1.

The system of FIG. 1 can also be further adapted to provide for bi-directional communication between a hearing/speaking user and a user that communicates through ASL, for example, as illustrated in FIG. 3. In the example of FIG. 3, a hearing user enters a message into the second user device 117, for example, by speaking into a microphone of the second user device 117 or by typing the message as text into the second user device 117. The second user device 117—shown in the example of FIG. 3 as a smart phone—then transmits the message to the portable user device 101—shown in the example of FIG. 3 as a tablet computer. In some implementations where the message is entered by the hearing user as audio, the second user device 117 automatically converts the audio into text before transmitting the message to the portable user device 101. The portable user device 101 processes the received message and identifies ASL gestures corresponding to the message. Videos and/or images of the ASL gestures are then shown on the display 108 of the portable user device 101 where they are viewed by the deaf user.

Although the examples of FIGS. 2 and 3 illustrate particular situations in which the system of FIG. 1 is used to facilitate communication between a deaf user (using ASL) and a hearing user, in some implementations, the system of FIG. 1 is further adapted and configured to provide other communicative functions. For example, in some implementations, the system of FIG. 1 may be adapted to enable the user to draft and send text messages and/or emails to other users using ASL gestures instead of typing. Similarly, the system of FIG. 1 may be adapted to enable a user to draft and store notes or other text-based documents to the portable device using ASL gestures instead of typing.

The system of FIG. 1 may also be adapted to facilitate sign language communication between two users (e.g., between two deaf users) even if the two users communicate using different types of sign language. For example, the system might be configured to capture and translate the message from sign language into text using the method of FIG. 2 and, once translated into text, transmit and display the message in sign language on another portable device using the method of FIG. 3. In such implementations, the system can be configured to use natural language processing to represent meaning from a "sign"/gesture and to convert the meaning into a different sign language. Techniques such as lambda calculus can be used in this regard.

Figure 4:
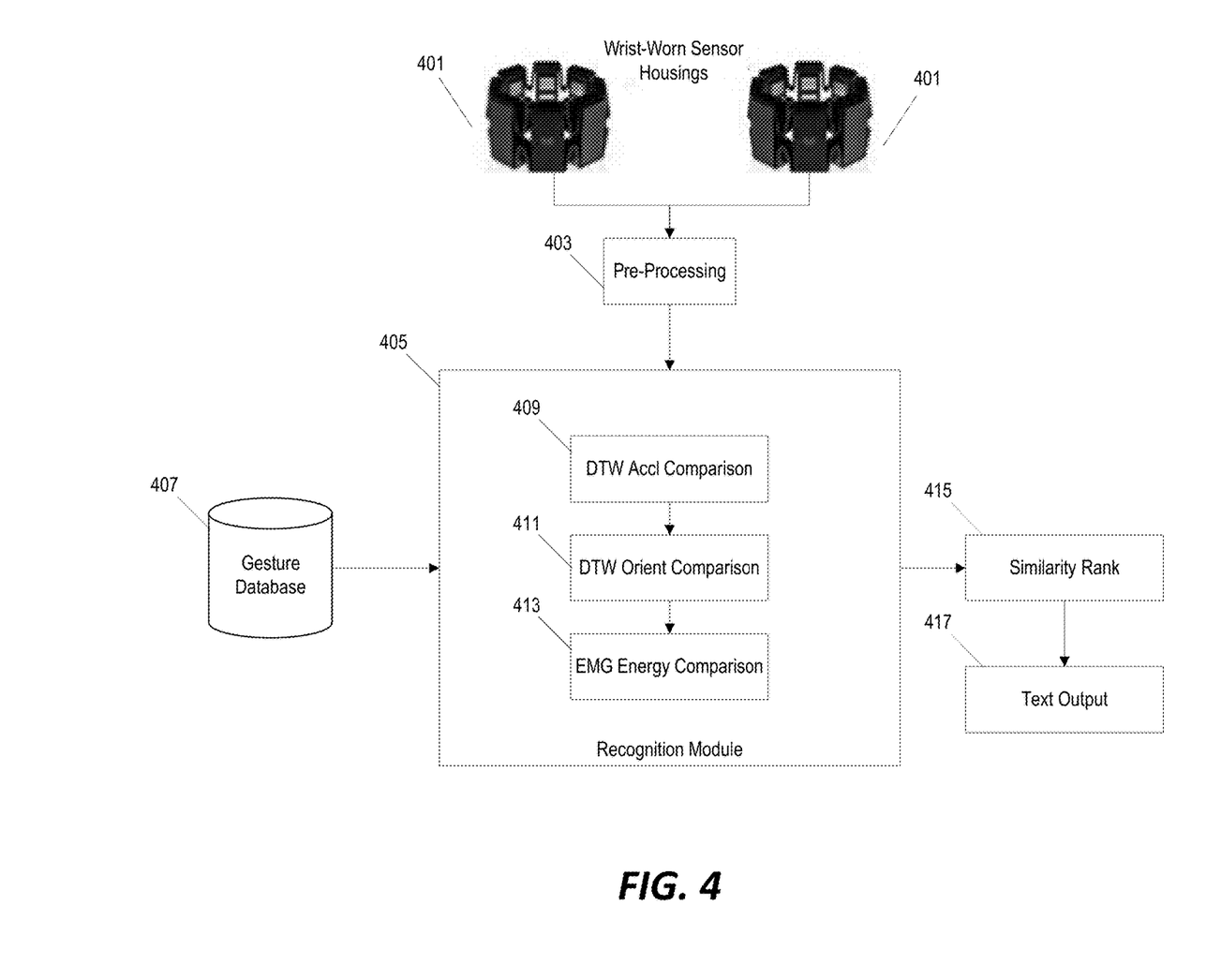
FIG. 4 is a schematic flowchart of a method of gesture recognition performed by the system of FIG. 1.

FIG. 4 illustrates in further detail an example of how the portable device 101 and/or the remote server computer 115 use gesture comparison and ranking to generate a text output from the data captured by the sensors. In this example, data is collected from a pair of wrist-worn devices while the user performs a gesture. Each wrist-worn device includes three accelerometers, three gyroscopic sensors, and eight EMG sensor "pods." A gesture database is provided with gesture "training" information that is then compared to newly captured gesture data to identify a corresponding text output. The gesture database is trained, for example, by first selecting either a "guided mode" or "ASL mode." A "sign" is selected from a drop down list or created through a user interface of the portable device 101 and then the user performs the gesture while wearing the wrist-worn devices. The system then annotates the input data with the name of the sign/gesture and stores the data to the gesture database.

If "guided mode" was selected, the system then performs a scan of the gesture database specific to the user and determines whether there are any clashes. If not, the user is asked to repeat the sign two more times after which the sign is stored to the gesture database and is ready to use. If, however, there is a clash (i.e., gesture data for the sign is already stored in the data base), then the user is instructed—through the user interface of the portable device 101, to choose another sign instead. If "ASL" mode was selected, the system does not give such feedback and simply prompts the user to train the system two more times.

After a trained gesture database is provided, the system can be used to identify gestures. A user wearing the wrist-worn devices performs a gesture and, as soon as the end of the gesture is detected or signaled, the preprocessing begins. The data collected from two hands is aggregated into one data-table and then stored into a file as an array of time-series data. At a 50 Hz sampling rate, a five second gesture will consist of six accelerometer vectors (each with a length of 250), six gyroscope vectors (each with a length of 250), and 16 EMG vectors (each with a length of 250). This data is combined into a 34×250 matrix. Each time-series is transformed to make sure the initial value is zero by subtracting this value from all values in the time-series. This helps to prevent errors when the user performs the sign/gesture with a different starting position. Normalization is then done by representing all values as floats between zero and one by a mix-max method.

Orientation values are received in the form of three time-series in terms of unit quaternions. The pitch, yaw, and roll values are obtained from the quaternion values w, x, y, and z by using the equation:

$$\text{roll} = \tan^{-1}\left(\frac{2(wx+yz)}{-x^2 y^2}\right) \quad (1)$$

$$\text{pitch} = \sin^{-1}(\max(-1, \min(1, 2(wy-zx))))$$

$$\text{yaw} = \tan^{-1}\left(\frac{2(wz+xy)}{-y^2 x^2}\right).$$

After correctly identifying the location of each of the individual pods of the two wrist-worn devices, data is stored and shuffled in such a way that the final stored data is aligned from EMG pod-1 to EMG pod-8. This provides flexibility as the user does not need to wear the wrist-worn devices in the same orientation/position every time. EMG energy, E, on each pod is calculated as the sum of squares of x[n], the value of the time-series at point 'n':

$$E = \text{sum}(x[n]^2).$$

Four different approaches are described herein for comparing the accelerometer and orientation data: (a) Euclidian distance, (b) Regression, (c) Principal Component Analysis (PCA), and (d) dynamic time warping (DTW). The Euclidian distance approach compares the two time-series using mean-squared error. Regression analysis fits a model to the time-series and uses this model to compare best fit for the test gesture. Given a set of features from the time-series for a gesture, PCA derives the optimal set of features for comparison. DTW is a technique to find an optimal alignment between two given (time-dependent) sequences under certain restrictions. Traditionally, DTW has been used extensively for speech recognition, and it is finding increasing use in the fields of gesture recognition as well, especially when combined with Hidden Markov Models. The example of FIG. 4 takes a simpler approach by randomly re-sampling the training and test datasets based on the least number of points in either one and then performing a DTW-based distance analysis on them. First a DTW analysis of Accelerometer Data is run and a ranked list of 'probable' signs is passed on for DTW based analysis of orientation Data which in turn creates an even shorter ranked list to be processed by the final EMG algorithm.

On another approach, the normalized distances from each of the outputs are taken and the sum of squares of the final output is taken as an indication of 'closeness' of a test sign to a training sign. Because this simplified approach is less computationally complex, it can improve the speed of gesture recognition.

The overall 'nearness' of two signs is computed to be the total distance between those signs which is obtained by adding up the scaled distances for accelerometer, orientation and EMG as discussed above. An extra step of scaling the distance values between (0,1) is performed so as to give equal weight to each of the features. Also, since we have 8 EMG pods and only 3 each of accelerometer and orientation sensors, we use the following formula for the combination. The formula is for combining accelerometer sum of distances and EMG sum of distances. Similar techniques were applied for the other combinations. An algorithmic summary is provided by the equation:

$$\text{dist} = (8cs(sc\_accl\_comb) + 3cs(sc\_emg\_comb))/24 \quad (3)$$

where cs( ) is a function that returns the sum of columns, sc_accl_comb is a data frame that holds the combined accelerometer DTW distances for both hands for all trained signs, and sc_emg_comb is a data frame that holds the combined EMG energy distances for both hands for all trained signs.

Due to timing constraints with respect to the real-time nature of the application, the recognition algorithm is optimized to be efficient, especially as the gesture space increases. As the number of gestures in the database increases to beyond 60, the recognition time for identifying one gesture goes beyond the 0.5 s mark. Thus, a comparison algorithm is configured to first compare to one stored instance of each gesture, then choose the top 'n' number of gestures which when compared to 'k' of each, still allowing the time-constraint to be fulfilled. We then, proceed with the normal gesture comparison routine on only these gesture instances and thus keep the recognition time within defined timing constraints. All the variables for this method viz. the 'n', 'k' are calculated dynamically by what is allowed by the timing constraint 'tc', thus making this approach fluid and adaptable to more vigorous time constraints if required.

The system, such as described in the various examples above, can be specifically trained and adapted to facilitate gesture-based communication in medical situations—particularly during urgent or emergency medical situations. Members of the deaf and hard of hearing community are at increased risk for misdiagnosis or delayed treatment in an urgent medical situation when they cannot quickly and accurately communicate their symptoms to healthcare providers even if they are fluent in American Sign Language (ASL). Equal access to quality healthcare can improve social functioning of the 2.1% and 13% of U.S. population who are deaf or hard-of-hearing, respectively. Communication barriers between healthcare providers and patients can significantly impact the quality of healthcare access. The consequences are most serious in emergency medical situations where information must be conveyed quickly and accurately. A recent survey on 89 deaf American Sign Language (ASL) users revealed that access to ASL interpretation can directly facilitate communication of important health information to the deaf patients and increase the appropriate use of preventative services. Increased availability of ASL interpretation might also improve communication efficiency in urgent medical situations. Hospital emergency rooms and urgent care facilities very rarely have in-person ASL interpreters consistently available. As a result, in absence of an ASL interpreter, communication with the patient will likely depend on note writing, which may be impeded by medical conditions, or ASL interpreting via remote video, which is costly.

The systems illustrated above are not only capable of facilitating gesture-based communication using a standardized sign language such as ASL, the system is also adapted to enable a user to train non-ASL gestures and associate them with specific concepts. This aspect is particularly relevant for health-related conditions because many medical terms may not have standard "signs" in ASL and, therefore, must be fingerspelled. Given that medical terms are often long and can be arduous to fingerspell, the systems and methods described above can greatly increase the speed and ease of communication by allowing the deaf patient to use a single gesture to convey a medical term.

In addition to complications introduced by attempting to use gesture-based communication to communicate terms for which there is no corresponding "sign," automated interpretation and capture of gesture-based communication can be further complicated by a lack of gestures to represent inflectional bound morphemes (e.g., suffixes indicating tense or degree) and linguistic prosody (e.g., indicating a statement vs. a question). Instead, users of ASL may express these components of the communication through other cues including eyebrow/body movements and facial expressions. Depending on these different sign cues, the person may be asking a question, expressing surprise, or neutrally expressing a statement.

Figure 5:
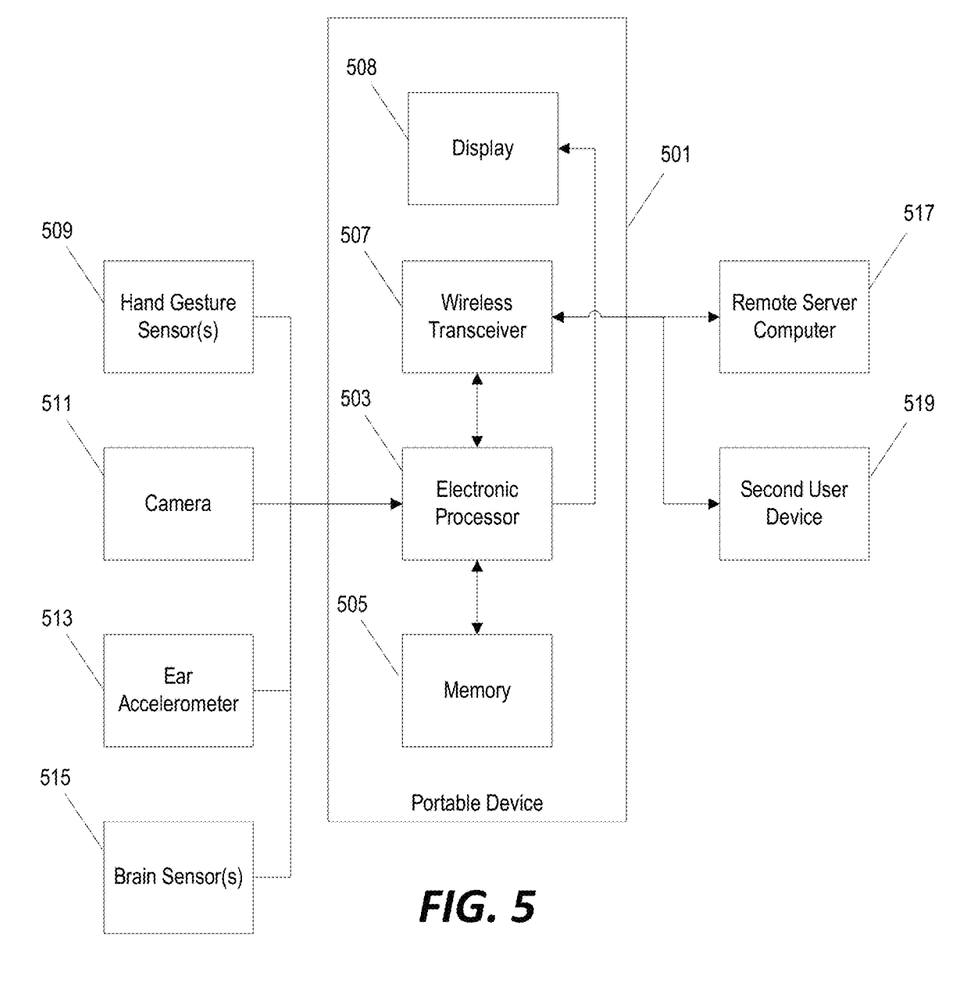
FIG. 5 is a block diagram of a system for automated gesture recognition-based communication enhanced by context and prosody information in accordance with another embodiment.

Accordingly, the systems and methods discussed above can be further adapted in some implementations to extract linguistic and affective prosody from signed communication and incorporating that prosodic information into an appropriate spoken language translation. FIG. 5 illustrates an example of a system that, like the example of FIG. 1 discussed above, includes a portable device 501 with an electronic processor 503, a non-transitory computer-readable memory 505, a wireless transceiver 507, and a display 508. The portable device 501 is selectively coupleable (e.g., through a wired or wireless communication link) to a series of sensors including one or more hand gesture sensors 509, a camera 511, an ear accelerometer 513, and one or more brain sensors 515. In some implementations, the hand gesture sensors 509 are again provided as a pair of wrist-worn devices that each include a plurality of acceleration, orientation/gyroscopic, and EMG sensors (e.g., the "Myo" Armband). The portable device 501 is also configured to communicate with other devices through its wireless transceiver 507 including, for example, a remote server computer 517 and a second user device 519.

Video data captured by the camera 511 (e.g., the built-in camera of a smart phone) can provide some potentially prosodic cues from head movement and facial expressions. However, the use of image data alone may be limited in that the signer may display eyebrow and body movements or facial expressions that are not part of the communicative message. Accordingly, for these potentially prosodic cues to be useful, the system must be further configured to determine whether the body/facial movements are related to the signed communication and when they are not.

Brain activity sensed by the one or more brain sensors 515 can also provide information that can be used for processing prosodic factors. For example, an expression of prosody information in spoken language is often preceded by a positive CZ channel response (called P300) and a prosody contradiction can be indicated by a unique negativity in the CZ channel (called N300) followed by a characteristic slow wave response. Accordingly, the system is configured to monitor the output from the brain sensors 515 to identify a cognitive connection between the modalities of hands, eyes, and body movements. For example, in some implementations, the system is configured to detect the P300 channel response and, in response, to flag certain movements and facial expressions that might be detected in the captured image data within a defined time period after the detection of the P300 channel response as potentially prosodic.

Figure 6:
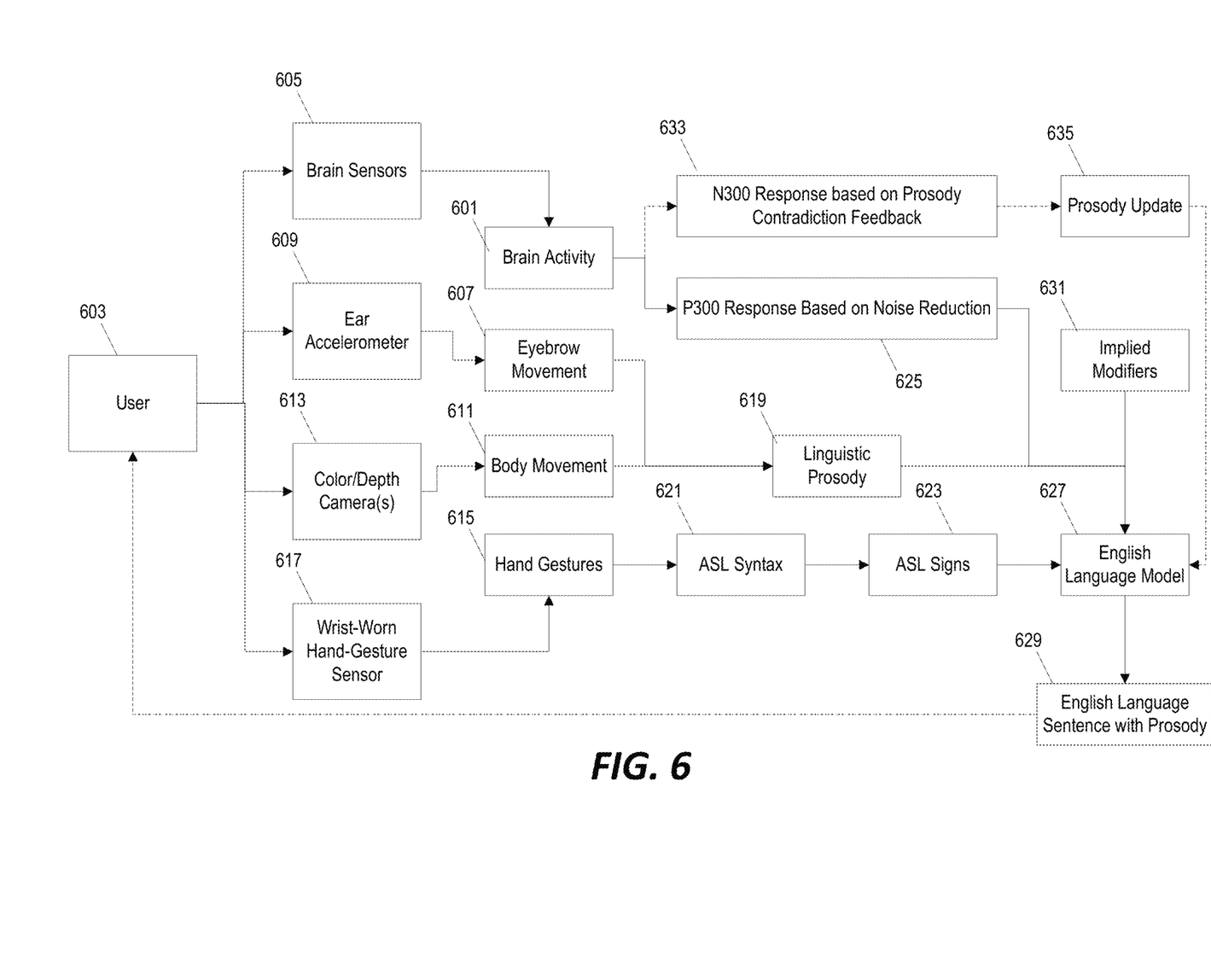
FIG. 6 is a schematic flowchart of a method for translating hand gestures into a language-based output using the system of FIG. 5.

FIG. 6 illustrates an example of a method of incorporating brain activity into sign language interpretation using the system of FIG. 5. The system monitors eyebrow and movements along with hand gestures through the wearable sensors and will also monitor the brain for emotional responses (e.g., a highly positive CZ channel data also known as the P300 response) from the signer. From the monitored brain data, the system will make a distinction between statement, question, and exclamation. The system then uses an appropriate ASL syntax to determine the sequence of signs performed by the individual. Based on the intensity of the brain activity during the signed movements, the system will choose appropriate implied modifiers. Using a model based on English language, the signed sequence will then be translated into an English sentence with prosody.

Figure 7:
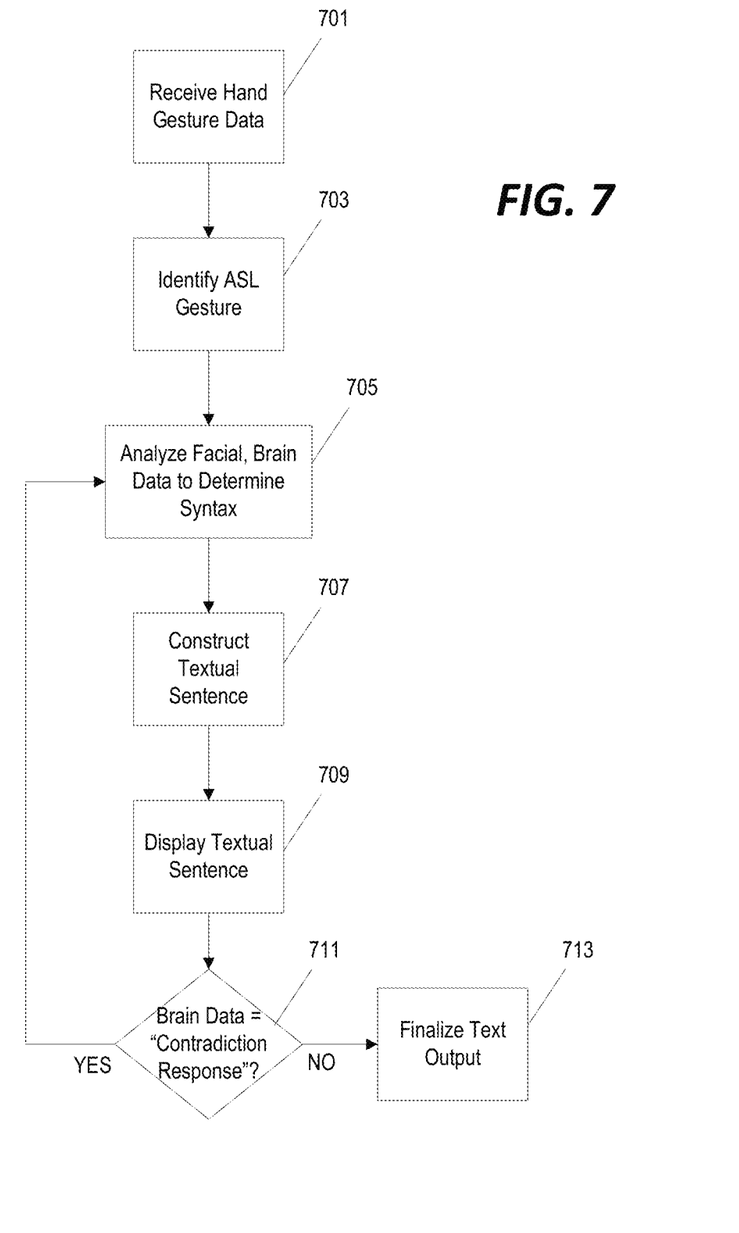
FIG. 7 is a flowchart of an iterative closed-loop method for translating hand gestures into a language-based output based on sensed contradiction data using the system of FIG. 5.

In some implementations, the system is further configured to implement closed-loop feedback to iteratively revise the English language sentence until it matches the intended message of the signer. In the example of FIG. 7, the system receives the hand gesture data (at block 701) and identifies the ASL gesture (at block 703). The system also analyzes facial, body, and brain data to determine syntax, context, and prosodic information (at block 705) before constructing a textual sentence (at block 707). The constructed textual sentence is then displayed to the user (e.g., on the display 508 of the portable device 501) (at block 709). The system then searches the data from the one or more brain sensors for an N300 response—the response associated with prosody contradiction (at block 711). A contradiction response would signal an incorrect interpretation and, in response, the system would then process alternative interpretations (e.g., the inclusion of a different modifier or a change in linguistic prosody) and select a new sentence for output on the display 508 (i.e., repeating steps 705, 707, and 709). This closed loop feedback operation continues until the person is satisfied with the translation (i.e., no N300 response detected).

In the examples of FIGS. 5 through 7, the system is configured for four types of monitoring: (1) brain activity for affective prosody extraction, (2) eyebrow movement for linguistic prosody extraction, (3) body movement for linguistic prosody extraction, and (4) hand gesture for extraction of ASL signs. In various other implementations, more, fewer, or different signals can be monitored for the functional purpose described herein. Similarly, more, fewer, or different sensors can be utilized. However, in this specific example, hand gestures are monitored using the "Myo Armband" including accelerometers, gyroscopic sensors, and eight electromyogram (EMG) pods and facial expressions are monitored using the ear accelerometer (detecting facial expressions that cause corresponding movements at the ear) and the camera data. In this example, brain activity can be monitored using either (a) a multi-channel EEG recording device (e.g., the ABM B-Alert X10 EEG) or (b) a single channel device (e.g., the Neurosky device). A multi-channel EEF device provides greater accuracy, but the single channel device provides better wearability for use in real-time situations.

Thus, the invention provides, among other things, a system and method for facilitating gesture-based communication and, in some implementations, for translating gesture data into natural language sentences accounting for prosody. Various features and advantages of the invention are set forth in the following claims.

What is claimed is:

1. A system for facilitating non-verbal communication, the system comprising:
   a hand-gesture sensor;
   at least one brain signal sensor;
   a display screen; and
   an electronic processor configured to
      receive data from the hand-gesture sensor indicative of one or more gestures performed by a user,
      determine, based on the data from the hand-gesture sensor, at least one word or phrase corresponding to the data from the hand-gesture sensor, and
      output on the display screen a text representation of the at least one word or phrase,
      monitor the at least one brain signal sensor for a signal indicative of a contradiction response, and
      in response to detecting the signal indicative of the contradiction response after outputting the text representation of the at least one word or phrase on the display screen, determining an alternative word or phrase based at least in part on the data from the hand-gesture sensor and outputting a text representation of the alternative word or phrase on the display screen.

2. The system of claim 1, wherein the hand-gesture sensor includes at least one sensor from a group consisting of a gyroscopic sensor, an accelerometer, and an EMG sensor, wherein the data received from the hand-gesture sensor includes a time-series data array of measured values from the at least one sensor sampled at a defined sampling rate, and wherein at least one word or phrase or the text representation of the at least one word or phrase is determined based in part on an output of the at least one brain sensor.

3. The system of claim 2, further comprising a computer-readable memory storing a gesture database, wherein the gesture database stores data indicative of a plurality of unique time-series data arrays and defines a different word or phrase corresponding to each unique time-series data array of the plurality of time-series data arrays, and
   wherein the electronic processor is configured to determine the at least one word or phrase corresponding to the data from the hand-gesture sensor by identifying a unique time-series data array of the plurality of unique time-series data arrays stored on the computer-readable memory that most closely matches the data from the hand-gesture sensor.

4. The system of claim 3, wherein the electronic processor is further configured to
   selectively operate in a training mode,
   output a prompt on the display screen, while operating in the training mode, instructing the user to perform a gesture corresponding to a particular word or phrase,
   receive the data from the hand-gesture sensor after outputting the prompt, and
   update the gesture database to define a new unique time-series data array corresponding to the particular word or phrase based on the data received from the hand-gesture sensor after outputting the prompt.

5. The system of claim 4, wherein the electronic processor is configured to output a prompt on the display screen instructing the user to perform an American Sign Language (ASL) gesture corresponding to the particular word or phrase.

6. The system of claim 5, wherein the electronic processor is configured to train the gesture database by iteratively prompting the user to perform a different one of a series of ASL gestures while receiving data from the hand-gesture sensor after each prompt.

7. The system of claim 1, wherein the hand-gesture sensor includes a plurality of gyroscopic sensors, a plurality of accelerometers, and a plurality of EMG sensors incorporated into a wrist-worn housing, and wherein the data received from the hand-gesture sensor includes a time-series data array of measured values from each gyroscopic sensor of the plurality of gyroscopic sensors, each accelerometer of the plurality of accelerometers, and each EMG sensor of the plurality of EMG sensors.

8. The system of claim 1, wherein the electronic processor is further configured to
   receive audio stream data,
   determine a particular word or phrase corresponding to the audio stream data, and
   output a video on the display screen of a gesture corresponding to the particular word or phrase.

9. The system of claim 1, further comprising:
   a first portable user device including the display screen, the electronic processor, and a wireless transceiver; and
   a remote server computer, wherein the remote server computer is configured to
      receive, from the first portable user device, data indicative of the data received from the hand-gesture sensor,
      process the data from the first portable user device to identify the at least one word or phrase, and
      transmit to the first portable user device an indication of the identified at least one word or phrase.

10. A system for facilitating non-verbal communication, the system comprising:
    a hand-gesture sensor;
    a display screen;
    a camera; and
    an electronic processor configured to
       receive data from the hand-gesture sensor indicative of one or more gestures performed by a user,
       determine, based on the data from the hand-gesture sensor, at least one word or phrase corresponding to the data from the hand-gesture sensor, and
       output on the display screen a text representation of the at least one word or phrase,
       receive image data of the user from the camera,
       determine, based on the image data from the camera, a linguistic prosody of the user, and
       generate a text sentence based on the at least one word or phrase corresponding to one or more hand gestures determined based on the data received from the hand-gesture sensor and the determined linguistic prosody of the user.

11. The system of claim 10,
    wherein the electronic processor is further configured to determine the linguistic prosody of the user by detecting, in the image data, at least one expression or movement indicative of a question, detecting, in the image data, at least one expression or movement indicative of an exclamation, and detecting, in the image data, at least one expression or movement indicative of a neutral statement, and wherein the electronic processor is configured to generate the text sentence based on the at least one word or phrase corresponding to one or more hand gestures determined based on the data received from the hand-gesture sensor and the determined linguistic prosody of the user by generating the text sentence as a question in response to detecting, in the image data, the at least one expression or movement indicative of the question, generating the text sentence as an exclamation in response to detecting, in the image data, the at least one expression or movement indicative of the exclamation, and generating the text sentence as a neutral statement in response to detecting, in the image data, the at least one expression or movement indicative of the neutral statement.

12. The system of claim 10, wherein the image data of the user from the camera includes at least one selected from a group consisting of facial movements of the user, facial expressions of the user, and body movements of the user.

13. The system of claim 10, further comprising at least one brain signal sensor, wherein the electronic processor is further configured to monitor the at least one brain signal sensor for a signal indicative of an expression of prosody information, and wherein the electronic processor is configured to analyze the image data from the camera to determine, based on the image data from the camera, a linguistic prosody of the user in response to detecting the signal indicative of the expression of prosody information.

14. The system of claim 13, wherein the electronic processor is configured to monitor the at least one brain signal sensor for the signal indicative of the expression of prosody information by detecting a positive CZ channel response in data from the at least one brain signal sensor.

15. The system of claim 13, wherein the electronic processor is further configured to monitor the at least one brain signal sensor for a signal indicative of a contradiction response after outputting the text sentence on the display screen, in response to detecting the signal indicative of the contradiction response after outputting the text sentence on the display screen, generating an alternative text sentence based at least in part on the data received from the hand-gesture sensor and the determined linguistic prosody of the user based on the image data from the camera, and output the alternative text sentence on the display screen.

16. The system of claim 15, wherein the electronic processor is configured to generate the alternative text sentence by generating the alternative text sentence based on an alternative linguistic prosody or an alternative word or phrase corresponding to at least one gesture.

17. The system of claim 15, wherein the electronic processor is configured to generate the text sentence in the form of a question in response to detecting, in the image data, at least one expression or movement indicative of a question, and generate the alternative text sentence in the form of a neutral statement in response to detecting, in the image data, the at least one expression of movement indicative of the question and subsequently detecting the signal indicative of the contradiction response after outputting the text sentence on the display screen in the form of the question.

18. The system of claim 15, wherein the signal indicative of the contradiction response includes a negative CZ channel response followed by a slow wave response.

19. A system for facilitating non-verbal communication, the system comprising:

at least one brain sensor;

a hand-gesture sensor, wherein the hand-gesture sensor includes at least one sensor from a group consisting of a gyroscopic sensor, an accelerometer, and an EMG sensor, wherein the data received from the hand-gesture sensor includes a time-series data array of measured values from the at least one sensor sampled at a defined sampling rate, and wherein at least one word or phrase or the text representation of the at least one word or phrase is determined based in part on an output of the at least one brain sensor;

a display screen;

a computer-readable memory storing a gesture database, wherein the gesture database stores data indicative of a plurality of unique time-series data arrays and defines a different word or phrase corresponding to each unique time-series data array of the plurality of time-series data arrays; and an electronic processor configured to receive data from the hand-gesture sensor indicative of one or more gestures performed by a user, determine, based on the data from the hand-gesture sensor, at least one word or phrase corresponding to the data from the hand-gesture sensor by identifying a unique time-series data array of the plurality of unique time-series data arrays stored on the computer-readable memory that most closely matches the data from the hand-gesture sensor, and output on the display screen a text representation of the at least one word or phrase, selectively operate in a training mode, output a prompt on the display screen, while operating in the training mode, instructing the user to perform a gesture corresponding to a particular word or phrase, receive the data from the hand-gesture sensor after outputting the prompt, and update the gesture database to define a new unique time-series data array corresponding to the particular word or phrase based on the data received from the hand-gesture sensor after outputting the prompt, output a prompt on the display screen instructing the user to perform an American Sign Language (ASL) gesture corresponding to the particular word or phrase, and train the gesture database by iteratively prompting the user to perform a different one of a series of ASL gestures while receiving data from the hand-gesture sensor after each prompt.

* * * * *